Oct. 22, 1946.　　　　H. W. JEWELL　　　　2,409,865
PIPE JOINING DEVICE
Filed Nov. 30, 1943

HOWARD W. JEWELL,
INVENTOR.

BY

ATTORNEY.

Patented Oct. 22, 1946

2,409,865

UNITED STATES PATENT OFFICE 2,409,865

PIPE JOINING DEVICE

Howard W. Jewell, Los Angeles, Calif.

Application November 30, 1943, Serial No. 512,332

6 Claims. (Cl. 285—113)

This invention pertains to improvements in methods and devices for joining sections of pipe. The invention is particularly directed to a device for centering adjacent sections of pipe and holding the same in position while such pipe sections are permanently joined together. Generally stated the device comprises a hollow sleeve having oppositely tapering end sections from a mid zone of greatest perimeter such sleeve being of a composition adapted to lose strength and be removed by liquids passing through the pipe in which the sleeve is installed.

Pipe lines or conduits for various purposes such as, for example, sewer lines, low pressure water lines, etc., are often made of ceramic pipe. In actual practice it is extremely difficult to make ceramic pipe such as burned clay or vitrified clay composition pipe of uniform internal or external diameter. Variations in composition of the clay, the moisture content, and temperature and time of burning influences the size of the finished burned pipe and as a result clay pipe varies appreciably in diameter. A 4 inch pipe, for example, may depart from this dimension plus or minus ⅛ inch. Problems are encountered therefor in laying pipe lines made of ceramic pipe sections in that water tight joints are difficult to make between adjacent pipe sections because of the variations in the diameter of the abutting pipe sections.

Moreover it is desired that the pipe sections be in axial alignment so as to present a smooth internal surface or face to the passage of fluid therethrough. Bell and spigot pipe has been largely displaced in recent years by plain-end pipe since stronger joints may be obtained by the use of suitable ceramic collars enclosing the abutting plain end pipe. Since most of these pipe lines are laid upon uneven ground some means must be provided for holding the abutting ends of adjacent pipe sections in alignment while a joint is formed around such abutting ends. These joints may be made by the use of any suitable cement. In some instances hydraulic cement compositions are simply plastered around the joint; in other instances, due to the character of the liquids which are to be passed through the pipe, sulphur-silica cements are employed in a similar manner. In other instances ceramic collars or fittings are slipped around the abutting ends of the pipe and suitable cements are then poured into the form made by the collar. In some instances metallic, segmental forms are placed around a joint and filled with cement to bond the adjacent pipe sections together and at the same time seal the joint; such metallic forms are often removed after the cement has set so as to permit re-use of the forms on other joints.

This invention is directed to a device which facilitates the laying and centering of adjacent pipe sections and assures proper spacing between the virtually abutting ends of adjacent pipe sections. The device itself is preferably made of a weakly coherent composition adapted to disintegrate under the action of liquids so that a smooth internal bore is presented without any lips or other obstructions to the liquids which needs pass through the pipe line or conduit.

An object of the present invention therefor is to disclose and provide improved methods and means for facilitating the laying of pipe lines.

Another object of the invention is to disclose and provide means for facilitating the proper placement of pipe sections in axial alignment.

A further object of the invention is to disclose and provide a device for centering adjacent sections of pipe and for temporarily holding the some in position which such pipe sections are joined together.

Further objects of the invention as well as the various uses to which the device may be put will become apparent to those skilled in the art from the following detailed description of certain exemplary forms in which the invention is embodied. In order to facilitate understanding, references will be had to the appended drawing in which.

Figure 1:
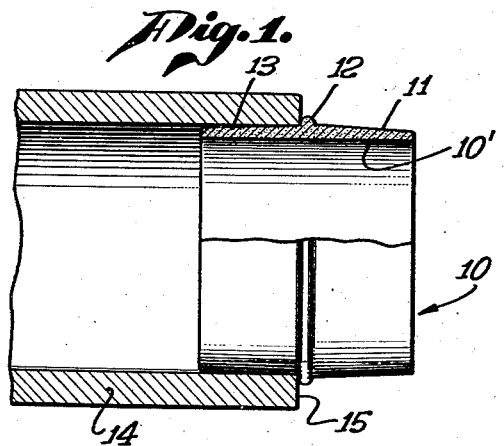
Figure 1 is an axial section through the end portion of a pipe provided with one of the devices of the present invention said device being partly broken away.
Figure 2:
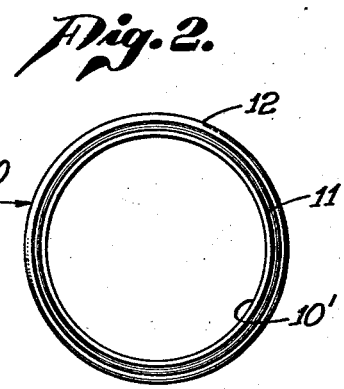
Figure 2 is an end elevation of the device shown in Figure 1.
Figure 3:
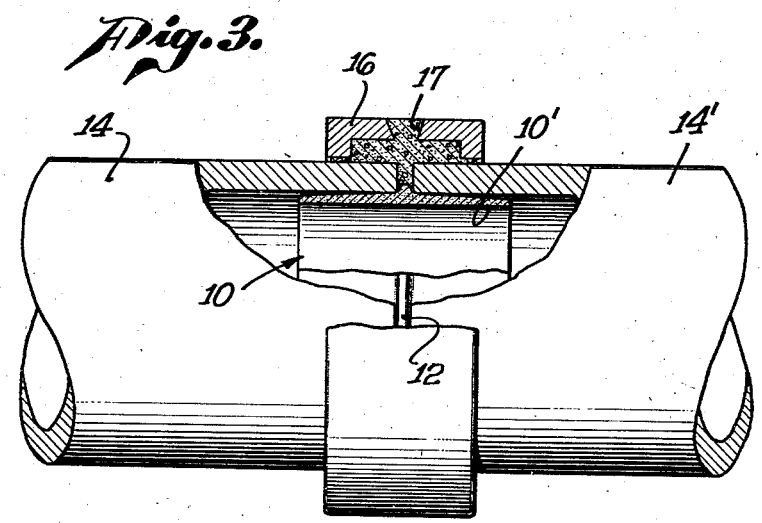
Figure 3 is a side elevation of a pipe joint made by the use of the device the joint itself employing a collar.

The device illustrated in Figures 1, 2 and 3 comprises a hollow sleeve 10 having the bore 10' and oppositely tapering end portions from a mid zone of greatest perimeter.

It will be noted that the outer surface 11 of the sleeve tapers downwardly towards the end and outwardly towards a mid-section which is provided with an outwardly extending circumferential bead 12. The bead 12 constitutes a stop which is positioned between the oppositely tapering end portions 11 and 13. The stop means may either consist of a circumferential bead 12 or a plurality of circumferentially arranged, spaced outwardly extending flanges, beads or lugs.

The oppositely tapering outer surface portions 11 and 13 may be provided with tapers on the order of 5° although tapers of from 2° to 10° may be employed. The total length of the sleeve need not be more than twice its outer diameter.

The sleeve described hereinabove is preferably made of a loosely or weakly coherent composition capable of disintegrating under the action of liquids which will later flow through the pipe line. The sleeve may be made of a composition including water-reactive or water-soluble constituents. The composition employed should give the sleeve sufficient mechanical strength to withstand handling and to permit the ends of the sleeve to be driven into the ends of pipe sections. For example, as shown in Figure 1 the sleeve 10 has been inserted into the end portion of the pipe 14 so that the end 15 of the pipe abuts the stop means 12. The pipe 14 may be a ceramic or clay pipe of an uncertain or varying internal diameter. The outer tapering surface 13 facilitates the insertion of the sleeve into the end of the pipe. The weakly coherent nature of the sleeve permits the sleeve to be driven into the end of the pipe 14, the material of the sleeve being either abraded, partly crushed or deformed or compressed somewhat in the event the pipe 14 is below standard size. The adjacent section of pipe will then be slipped upon the tapering surface 11 until the end of such section abuts the stop means 12. The sleeve 10 will then hold these two abutting pipe sections in alignment with their ends suitably spaced by the stop means 12. It may be noted that the stop means 12 should not cover the end 15 of the pipe 14 but simply act as a means for suitably spacing the ends of the abutting pipe sections so as to permit some cement to enter between the adjacent ends of the pipe sections during the cementing or joining operation.

A great variety of compositions may be employed for the centering and holding sleeves. Papier-mâché has been used successfully. The sleeves may be molded from gypsum or compositions containing gypsum. The sleeves 10 may be made of unburned clay compositions such as, for example, compositions containing clay and fibre or clay, gypsum and a water-soluble binder. Water-soluble binders may include salt, sugar or molasses, naphthalene, alum and other relatively inexpensive water-soluble substances capable of exerting a bonding effect when dry and of losing such bonding effect in the presence of liquids. Clay moistened with a brine solution may be used in molding the sleeves. Various gums capable of swelling in the presence of moisture so as to disrupt the sleeve may also be employed. All of these compositions should be capable of exhibiting sufficient strength, in the dry state so as to permit the sleeve to be handled in the manner described hereinabove, but to dissolve, disintegrate or disrupt in the presence of liquids so that after the pipe line has been installed these various devices will be washed away and not interfere or offer resistance to the passage of liquid through completed pipe line.

After the end portions of adjacent pipe sections are held in position by the sleeve a suitable cement is applied to the external surface of the pipe in the region of the joint so as to seal and cement such joint. In Figure 3 the two pipe sections 14 and 14' are shown being held by the sleeve 10, a collar or outer sleeve 16 provided with a pour hole 17 is moved over the joint and a suitable cement or sealing compound is poured into the annular space between the outer sleeve 16 and the outer surface of the pipe through the pour hole 17 so as to fill such annular space as well as the space between the abutting ends of the adjacent pipe sections, thereby completely sealing the joint. Sleeves of the character shown in my prior Patent No. 2,313,074 may be employed. It will be noted that the device of the present invention prevents the cement or sealing compound from leaking into the pipe through openings or spaces between the end surfaces of the adjacent pipe sections.

Various changes may be made in the contour, shape and in the proportions of the sleeves. The oppositely tapering outer surfaces 11 and 13 of the sleeves may be provided with dimples, beads or longitudinal extending beads, these various beads or dimples being capable of assisting in the centering operation but by reason of the friable or disruptive nature of the composition such beads are easily abraded or broken off in the event the internal diameter of the pipe is smaller than normal.

Figure 4:
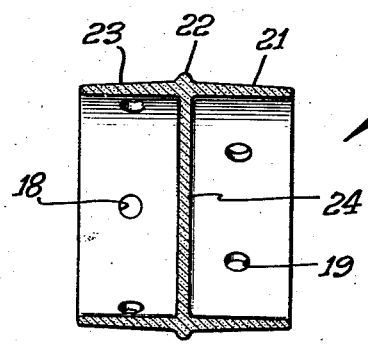
Figure 4 is an axial section taken through a modified form of centering and holding device.

Figure 4 illustrates a modification in which the sleeve is provided with outwardly and oppositely tapering outer surfaces 21 and 23 and a stop means 22. The end portions of the sleeve may be provided with a plurality of ports or apertures 18 and 19. Moreover the sleeve may be provided with a transverse partition 24; such partition imparts some added strength to the sleeve and thereby obviates breakage during handling, insertion into the pipe end, etc.

After a pipe line has been laid by the use of the devices shown in Figure 4 a volume of water may be forced through the pipe line and it will be found that the various partitions 24 will readily break thereby facilitating the destruction and removal of the entire sleeve. The bursting of the partitions ordinarily causes the entire sleeve to crack thus expediting the rapid removal of the entire sleeve by the water passing through the pipe line.

Various changes, modifications and adaptations of the method and devices here and above described will readily occur to those skilled in this art. It is to be understood that although a particular form of joint has been illustrated in Figure 3, the invention is not limited thereto. As previously stated, it is not necessary to employ the outer sleeve 16 shown in Figure 3 since other ways of cementing or sealing the joints may be used.

All changes and modifications coming within the scope of the appended claims are embraced thereby.

I claim:

1. A pipe joint comprising two plain end pipe sections of substantially uniform inside diameter in axial alignment, a hollow sleeve comprising a material rapidly disintegrable by action of liquid having a beaded and thickened mid-portion with said bead extending partway between and separating the ends of the pipes, ends on the sleeve tapered inwardly from the bead to a position spaced from the inside wall of the pipe and adapted to entrap liquid between the sleeve and pipe wall to promote disintegration of the sleeve, and a layer of sealing cement surrounding the ends of the pipe adjacent the joint and extending between the abutted ends of the pipe to a position initially in contact with the bead on the sleeve.

2. A pipe joint comprising two plain end pipe sections of substantially uniform inside diameter in axial alignment; a hollow sleeve composed of papier-mâché disintegrable by action of liquid and having a beaded and thickened mid portion with the bead extending part way between and separating the end of the pipes; the ends on the sleeve tapering inwardly from the bead to a position spaced from the inside wall of the pipe and adapted to entrap liquid between the sleeve and pipe wall to promote distintegration of the sleeve; and a layer of sealing cement surrounding the ends of the pipe adjacent the joint and extending between the abutted ends of the pipe to a position initially in contact with the bead on the sleeve.

3. A pipe joint of the character stated in claim 1 wherein the hollow sleeve is composed of an unburned clay-containing composition.

4. A device for placing plain end pipe sections in axial alignment in making a joint therebetween, said device comprising a hollow sleeve composed of a material rapidly disintegrable by the action of liquid, said device having a thickened mid portion provided with an outwardly extending bead, said bead being adapted to extend between abutting ends of pipe sections in alignment, the ends of the sleeve tapering inwardly from the bead to positions spaced from the inner walls of pipe into which said sleeve ends may extend to permit liquid to enter between the sleeve ends and pipe wall and promote disintegration of the sleeve after it is installed.

5. A device of the character stated in claim 4 wherein the hollow sleeve is composed of papier-mâché.

6. A device of the character stated in claim 4 wherein the hollow sleeve is composed of an unburned clay-containing composition.

HOWARD W. JEWELL.